(12) United States Patent  
Maw et al.

(10) Patent No.: US 8,953,751 B2  
(45) Date of Patent: Feb. 10, 2015

(54) METHODS AND SYSTEMS FOR STORAGE AND RETRIEVAL OF ORIGINATING CALLER LOCATION INFORMATION IN AN EMERGENCY SERVICES SYSTEM

(71) Applicant: Synergem Technologies, Inc., Greensboro, NC (US)

(72) Inventors: Richard Maw, Dennis, MA (US); Myron S. Herron, Jr., Greensboro, NC (US)

(73) Assignee: Synergem Technologies, Inc., Greensboro, NC (US)

( * ) Notice: Subject to any disclaimer, the term of this patent is extended or adjusted under 35 U.S.C. 154(b) by 0 days.

(21) Appl. No.: 13/846,759

(22) Filed: Mar. 18, 2013

(65) Prior Publication Data

US 2014/0270098 A1    Sep. 18, 2014

(51) Int. Cl.
 *H04M 11/04* (2006.01)
 *H04M 3/51* (2006.01)

(52) U.S. Cl.
 CPC .................................. *H04M 3/5116* (2013.01)
 USPC ........................................................... 379/45

(58) Field of Classification Search
 None
 See application file for complete search history.

(56) References Cited

U.S. PATENT DOCUMENTS

| | | | |
|---|---|---|---|
| 2004/0184584 A1* | 9/2004 | McCalmont et al. | 379/45 |
| 2011/0043332 A1* | 2/2011 | Main et al. | 340/8.1 |
| 2013/0183924 A1* | 7/2013 | Saigh et al. | 455/404.2 |
| 2013/0208879 A1* | 8/2013 | Rosenhaft et al. | 379/207.11 |

* cited by examiner

*Primary Examiner* — Maria El-Zoobi
(74) *Attorney, Agent, or Firm* — Lane Powell PC

(57) ABSTRACT

Methods and systems for the storage and retrieval of originating caller location information in an emergency services system are disclosed. Subscriber information from a telephone service provider is received by a NG-911 service provider, the subscriber information including a subscriber telephone number and an associated subscriber address. The service provider generates geo-spatial coordinates corresponding to said subscriber address and stores the subscriber information and the corresponding geo-spatial data in a geographic information system (GIS) database, indexed at least according to said subscriber telephone number. In response to a query from a PSAP relating to an emergency service call originating from the subscriber telephone number, the NG-911 service provider queries the GIS database for the originating telephone number and returns the geo-spatial coordinates and the associated subscriber address.

11 Claims, 3 Drawing Sheets

METHODS AND SYSTEMS FOR STORAGE AND RETRIEVAL OF ORIGINATING CALLER LOCATION INFORMATION IN AN EMERGENCY SERVICES SYSTEM

BACKGROUND

One of the most challenging but important aspects for government agencies charged with handling emergency service calls (e.g. 911 calls) is quickly and accurately determining the appropriate location to dispatch the needed emergency resources. The individuals making such calls are often under high levels of stress and may not be able to provide emergency service operators with accurate location information.

Enhanced 911 ("E911") and Next Generation 911 ("NG-911") are standards defined by the National Emergency Number Association (NENA) used in in the United States and Canada for linking emergency callers with the appropriate public resources. Originating call location determination is an important concept in the way that the emergency service systems work, specifically being able to immediately and accurately determine the location corresponding to the origination of the phone call. The type of originating device affects the manner in which the originating call location may be determined. For instance, landline (or wireline) calls are handled differently than calls from cellular phones or voice-over-IP (VoIP) telephones. Unlike cellular or VoIP phones, whose physical location at any given time may be independent of any fixed address associated with the assigned telephone number, wireline calls can generally be associated with a single fixed location, such as the customer's billing address. However, a wireline phone is not aware of its own physical location. After 9-1-1 is dialed, while the caller's voice is being delivered to an appropriate emergency services operator, background processes are automatically determining the call's originating location. Ideally, the location information is delivered to the emergency services operator simultaneously with the voice call.

In a legacy E911 system when a wireline telephone dials a telephone number, a connection is opened over a local section of a public switch telephone network (PSTN) to a local telephone exchange. In addition to a voice communication channel, the outgoing call also transmits the originating telephone number, our automatic number information (ANI). For non-emergency calls, the exchange determines how to route the call across the PSTN to the line associated with the dialed number so that a voice communication connection can be made between the originating wireline telephone and the destination line. However, if the number dialed is an emergency services number, special handling is required because there is no single telephone line or destination associated with the number. Instead, the originating wireline telephone should be connected to the Public Safety Answering Points (PSAPs) that serves the region the emergency call is originating from. (Depending on the geography of the region, there may be multiple PSAPs associated the same exchange and one PSAP may cover multiple exchanges.) Each PSAP covers a particular emergency service zone, which is determined by the dispatch and response arrangements for the fire, police, and medical services for a particular area. Thus, when the exchange recognizes an emergency services call, it switches the call to a selective router, which uses the originating call's ANI to determine the appropriate PSAP to connect with the call.

The PSAP receives the call, including the voice channel and ANI and must then determine the caller's location. The PSAP queries an Automatic Location Information (ALI) database with the originating call's ANI. The ALI database, which is often maintained on behalf of local governments by contracted private third parties, such as the local telephone service provider (TSP). The ALI database uses the telephone number assigned to the originating wireline telephone as a search key. The ALI record associated with the query, referred to as caller location information (CLI) is then returned to the PSAP where it is associated to the specific operator receiving the call and the address information is displayed on the operator's computer screen.

The Caller Location Information (CLI) provided is normally integrated into the PSAP's computer-assisted dispatch system. Early systems provided text display of the caller's address, call history and available emergency response resources. More modern computer-aided dispatch systems utilize geographic information systems (GIS) to implement real-time on-screen E911 street map displays to highlight information such as the caller's position, nearest available emergency responders and other relevant information such as fire hydrants, hazardous materials and/or other data maintained by the city.

Conventionally, ALI database is maintained in a traditional database management system (DBMS), which consists of rows of information utilizing a primary retrieval key of the origination phone number. In this scenario, when the originating phone number is submitted by the PSAP's call handling equipment to the location information provider, looked up in the DBMS-based ALI database, and the applicable location information then returned to the PSAP for use in handling and acting upon the call.

BRIEF DESCRIPTION OF THE DRAWINGS

Various embodiments in accordance with the present disclosure will be described with reference to the drawings, in which.

DETAILED DESCRIPTION

Figure 1:
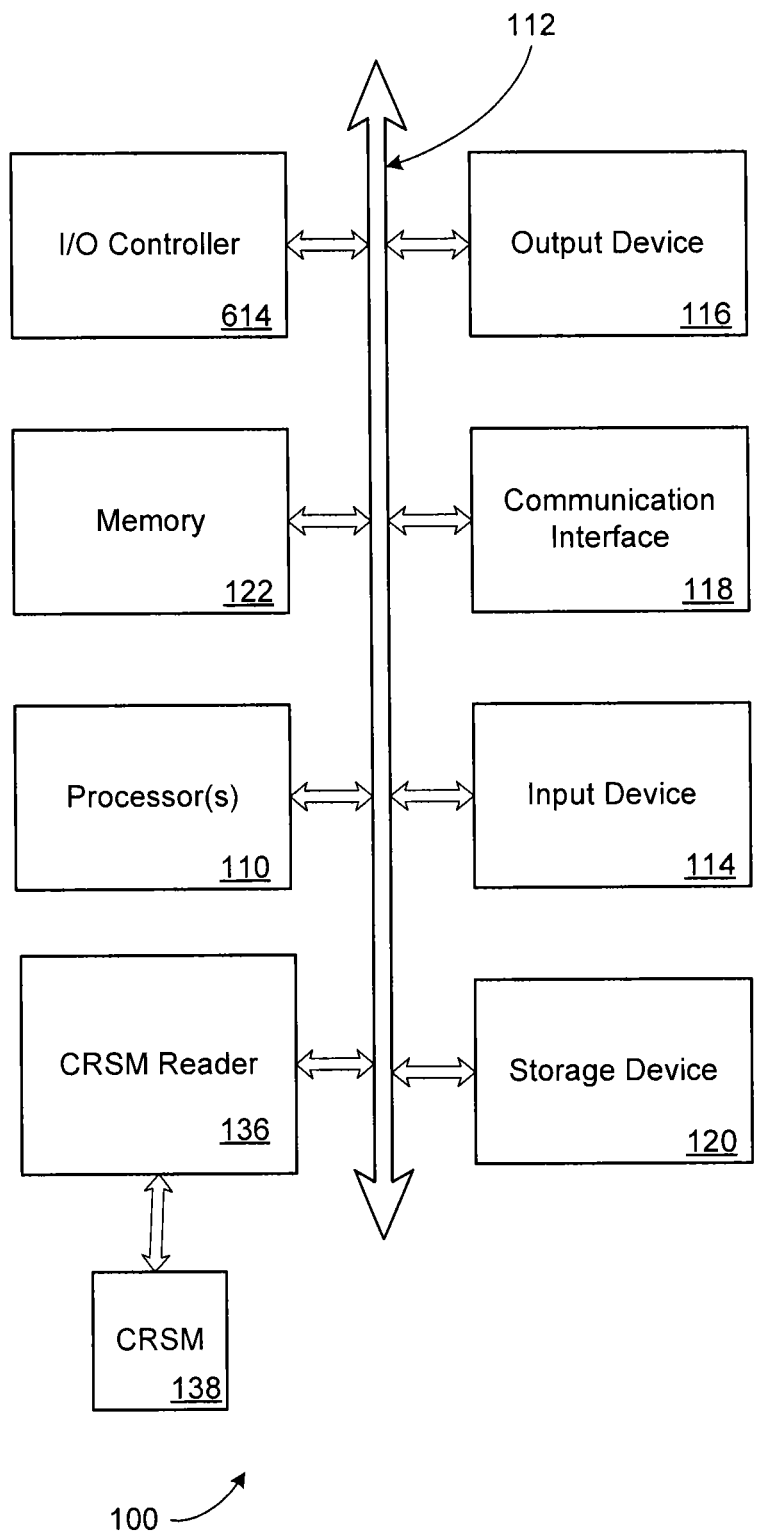
FIG. 1 is a schematic diagram depicting aspects of a non-limiting, exemplary computing architecture suitable for implementing at least some aspects and/or embodiments of the present systems and methods.

This description discusses various illustrative embodiments of the present methods and systems for storage and retrieval of originating caller location information in an emergency services system ("the present methods and systems") with reference to the accompanying drawings in order to provide a person having ordinary skill in the relevant art with a full, clear, and concise description of the subject matter defined by the claims which follow, and to enable such a person to appreciate and understand how to make and use the same. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive rights.

This description focus on embodiments of the present methods and systems in the context of a NG-911 system, as defined by the National Emergency Number Association ("NENA") NG-911 standard. As is described in more detail below, the present methods and systems operate in the context of a location information server (LIS) that advantageously combines geospatial location information with more traditional legacy civic address information, indexed by wireline telephone numbers. An LIS embodying aspects of the present methods and systems provides an emergency services operator receiving an emergency call with accurate geospatial information describing the physical location of the origination of the emergency call. Other aspects of the present methods and systems permit a PSAP to transmit emergency notifications to all wireline telephones assigned to addresses within a given geographic region.

Embodiments of the present methods and systems are generally, but not exclusively, intended for use the NENA NG-911 standard, telephone subscriber location records are stored in the Emergency Call Routing Function (ECRF)/Location Validation Function (LVF) functional elements of a NG-911 Emergency Services IP Network (ESInet), to facilitate implementation of the Location Information System (LIS) functional element in the ESInet. Consistent with the new NENA NG 911 requirements, embodiments of the present methods and systems will, as an alternative to the legacy means of location determination, utilize a geographical information system (GIS) database to relate the location of fixed originating call devices, such as traditional wireline telephones or VoIP phones, to a physical civic (street) address as well as to geospatial coordinates, such as longitude and latitude.

Embodiments of the present methods and systems may be implemented by systems using one or more programmable digital computers. Computer and computer systems in connection with embodiments of the invention may act, e.g., as workstations and/or servers, such as described below. Digital voice and/or data networks such as may be used in connection with embodiments of the invention may also include components (e.g., routers, bridges, media gateways, etc.) with similar architectures, although they may be adapted, e.g., as known in the art, for their special purposes. Because of this commonality of architecture, such network components may be considered as computer systems and/or components of computer systems when consistent with the applicable context.

FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 1 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 1) and/or memory 122 may store instructions executable by one or more processors or kinds of processors 110, data, or both. Some groups of instructions, possibly grouped with data, may make up one or more programs, which may include an operating system such as Microsoft Windows®, Linux®, Mac OS®, or Unix®. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 1) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash RAM. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CSRM 138.

The terms "computer-readable storage medium" and "computer-readable storage media" refer, respectively, to a medium and media capable of storing information. As such, both terms exclude transient propagating signals.

Two or more computer systems 100 (FIG. 1) may communicate, e.g., in one or more networks, via, e.g., their respective communications interfaces 118 and/or network interfaces (not depicted).

Figure 2:
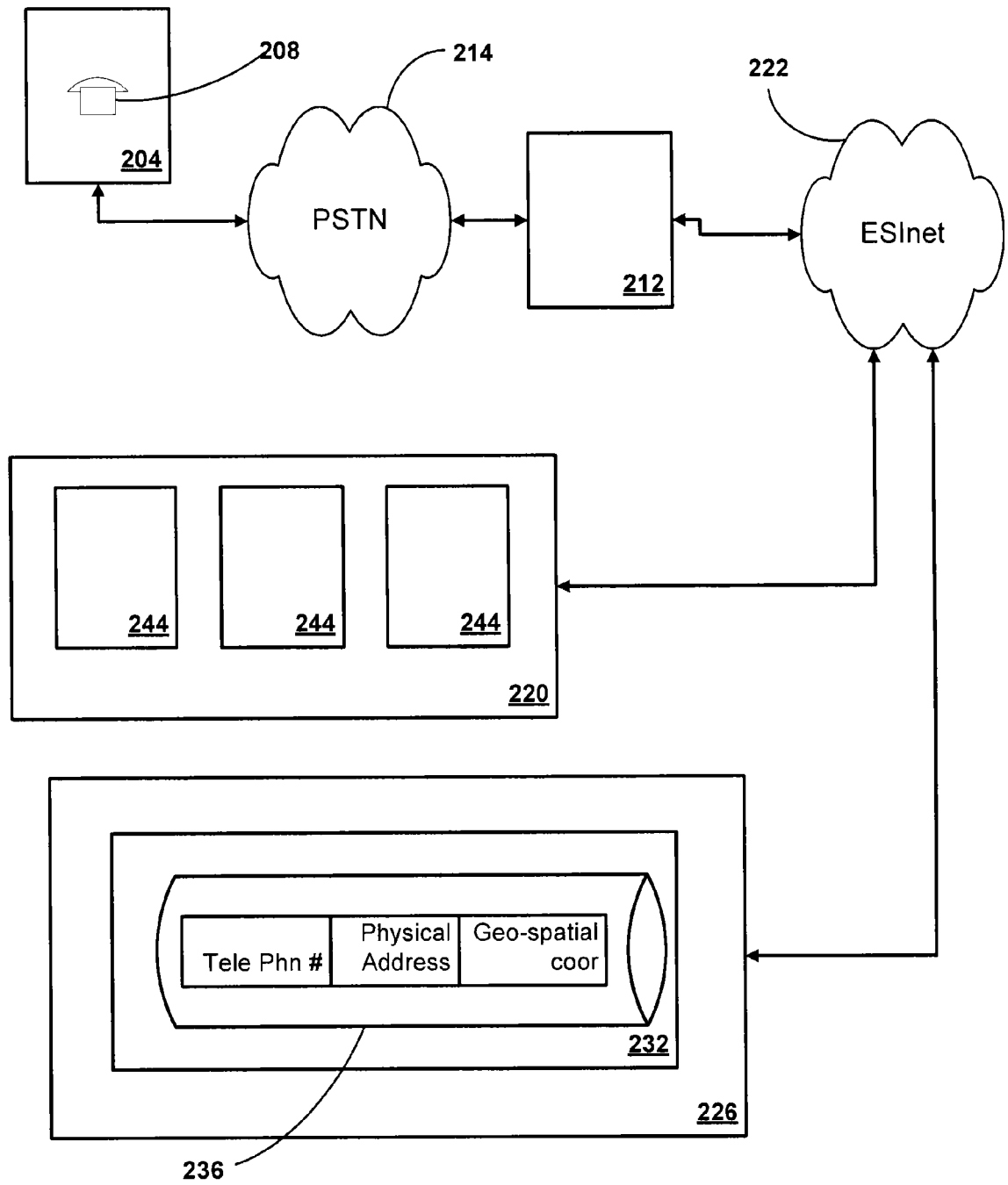
FIG. 2 is a functional block diagram depicting aspects of a NG-911 system suitable for implementing embodiments of the present methods and systems.

FIG. 2 depicts a NG-911 system suitable for implementing aspects of the present methods and systems. A subscriber wireline telephone number is associated with a physical address 204 by a telephone service provider (TSP) 312. A wireline telephone 208 at the address 208 may be connected to TSP 212 via the local PSTN 214 and is then connectable to the appropriate PSAP 220 via the local ESInet 222. The PSAP 220 may further be connected to an NG-911 service provider 226 via ESInet 222. The NG-911 service provider 226 may advantageously provide the NG-911 LIS functionality 228 for the PSAP 220. Specifically, the NG-911 service provider may implement NG-911's ECRF and LVF functional elements, including the LIS functional element 232 having a GIS database 236. In the event of an emergency service call originating from the telephone number associated with physical address 204, the call is routed to the appropriate PSAP 220 in accordance with the NENA NG-911 standard. The PSAP 220 may then query its NG-911 service provider 226 for LIS information corresponding to the originating telephone number. In accordance with embodiments of the present methods and systems, the LIS looks up the originating telephone number in the GIS 224 and returns both the physical address and the geo-spatial coordinates to the PSAP 220, where the originating number and physical address may be displayed as text to the terminal 244 of the emergency services operator assigned to the call and the geo-spatial coordinates may be used to generate a map display indicating the geographic location of the physical address relative to the surrounding area.

Figure 3:
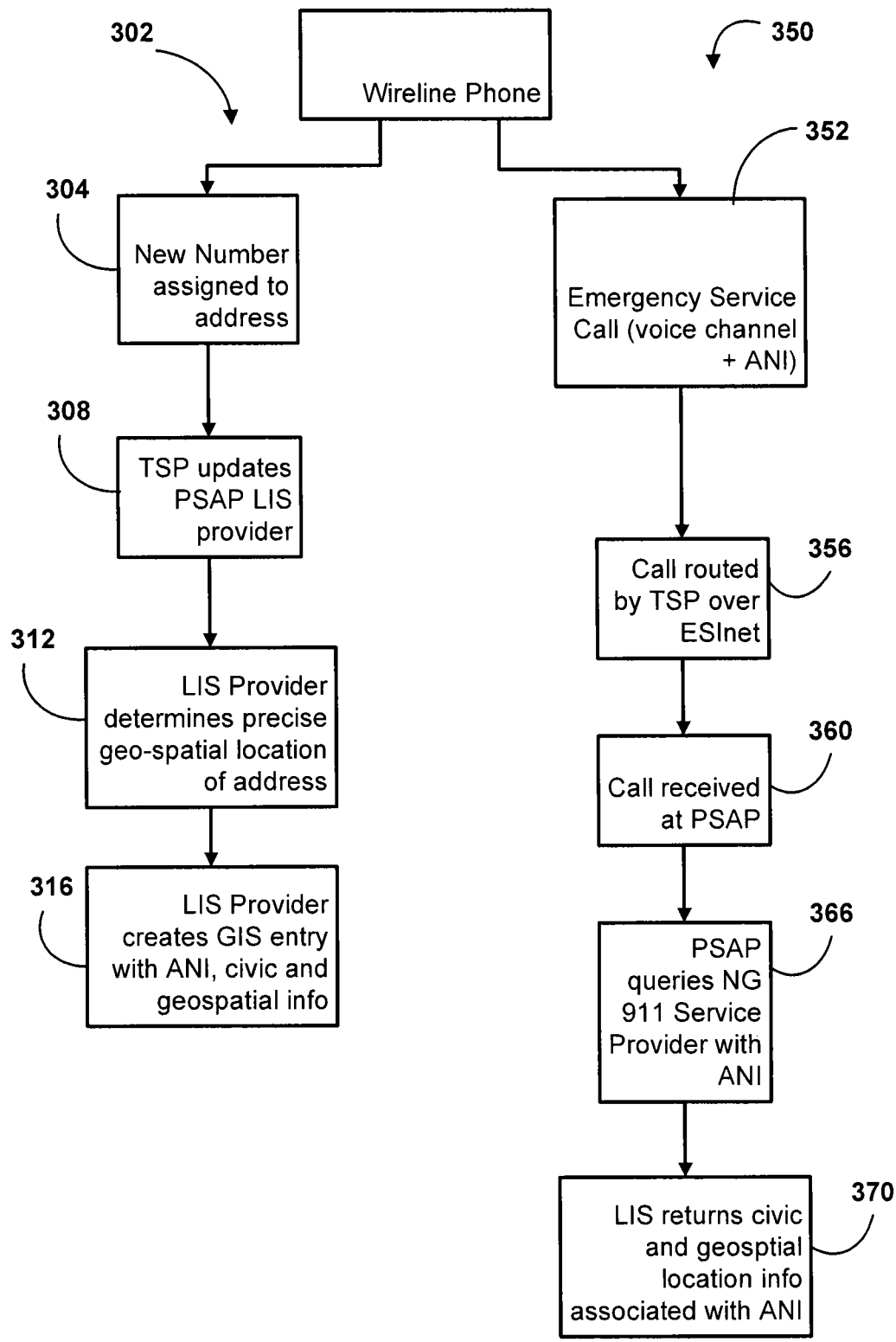
FIG. 3 is a flow chart depicting the steps of associating physical addresses and geospatial coordinates with wireline phone numbers and the steps of accessing the associated data in the event of an emergency services call from a wireline phone number in accordance with embodiments of the present methods and systems.

FIG. 3, in conjunction with FIG. 2, depicts a series of steps in accordance with at least one embodiment of the present methods and systems for associating accurate location information with an associated telephone number in the NG-911 service providers LIS 302. Upon a request by a customer, the TSP assigns a new telephone number to a particular physical address 304. As part of its agreement with the local PSAP, the TSP may issue periodic updates of all such assignments to the PSAP's NG-911 service provider 308. The NG-911 service provider may then determine a precise physical location with the address associated with the new telephone number 312 and store both a record of both the physical address and the geo-spatial coordinates in a single GIS database 316.

The NG-911 service provider may use two methods for determining a precise physical location of an address associated with telephone number. First, an automated centerline mapping technique is used to determine an approximate location of a given address on a map. The precise coordinates, e.g. longitude and latitude, of the address may then be determined, e.g. by manual inspection of the approximate area selected by the centerline mapping process.

FIG. 3, in conjunction with FIG. 2, further depicts a series of steps in accordance with at least one embodiment of the present methods and systems for delivering accurate location information for emergency service calls 350. When an emergency service call originates from a wireline telephone 352 the call is routed by the TSP over the regional ESInet 356 in accordance with the NENA NG-911 standard. The appropriate PSAP receives the call, including the originating telephone number, from the ESInet 360 and then queries its NG-911 service provider with the telephone number 366. The NG-911 service provider in turn looks up the telephone number in the GIS database associated with the querying PSAP and returns both the civic street address information as well as the corresponding precise geo-spatial coordinates to the PSAP 370. The originating telephone number and corresponding address may then be displayed as text to the emergency services operator assigned to the call and the geo-spatial coordinates may be used to generate a map display indicating the geographic location of the physical address relative to the surrounding area.

An additional aspect of the present methods and systems is to facilitate the visual placement of the originating caller's location on a map display, allowing the originating call devices (telephones) to be geospatially assigned and displayed for use in a PSAP's outbound incident notification system, where the notification is initiated by the drawing of a polygon type feature on a map to designate the geographic area and telephone devices therein that will receive the incident notification. Because the devices are geospatially assigned in the ESInet's database functional elements, the relevant telephone devices can be found using geometric queries without a need for secondary or post processing.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Exemplary embodiments of the present methods and systems have been described in detail above and in the accompanying figures for illustrative purposes. However, the scope of the present methods and systems are defined by the claims below and is not limited to the embodiments described above or depicted in the figures. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

That which is claimed is:

1. A method comprising:
   (a) receiving subscriber information from a telephone service provider, said subscriber information including a subscriber telephone number and an associated subscriber address located in a known geographic region;
   (b) generating geo-spatial coordinates corresponding to said subscriber address by:
      (i) determining an approximate geographic location of said subscriber address via an automated center-line mapping process,
      (ii) displaying for comparison said approximate geographic location against an address point map of said known geographic region,
      receiving a manual selection of a particular address point as being associated with said subscriber address, and
      (iii) determining a set of geo-spatial coordinates corresponding to a physical location of said particular address point; and
   (c) storing said subscriber information and said corresponding geo-spatial data in a geographic information system (GIS) database, indexed at least according to said subscriber telephone number.

2. The method of claim 1, where the method further includes the steps of:
- (d) in response to a query, said query relating to emergency services call originating from said subscriber telephone number:
  - (i) querying said geographic information system database for said originating telephone number; and
  - (ii) returning said geo-spatial coordinates and said associated subscriber address.

3. The method of claim 1, wherein said geo-spatial coordinates correspond to longitude and latitude coordinates of said subscriber address.

4. The method of claim 1, wherein step (a) is triggered by the association of said subscriber telephone number with said subscriber address by said telephone service provider and is performed as part of an update process between said telephone service provider and an operator of said GIS database.

5. The method of claim 4 wherein said update process occurs on a periodic basis and encompasses all new associations of subscriber telephone numbers with subscriber addresses made by said telephone service provider during said period.

6. The method of claim 5, wherein said update process occurs on a daily basis.

7. The method of claim 2, further comprising determining a confidence level relating to the correspondence between said geo-spatial coordinates and said associated subscriber address and step (d)(ii) includes returning an indication of said confidence level.

8. A method comprising:
- (a) receiving subscriber information from a telephone service provider, said subscriber information including a subscriber telephone number and an associated subscriber address;
- (b) generating geo-spatial coordinates corresponding to said subscriber address by determining a confidence level relating to the correspondence between said geo-spatial coordinates and said associated subscriber address;
- (c) storing said subscriber information and said corresponding geo-spatial data in a geographic information system (GIS) database, indexed at least according to said subscriber telephone number; and
- (d) in response to emergency services call originating from said subscriber telephone number:
  - (i) querying said GIS database with said originating telephone number; and
  - (ii) receiving said geo-spatial coordinates; and
- (e) displaying a map of a geographic region displaying an icon on said map corresponding to the physical location of said originating address relative to said geographic region and said icon includes a variable characteristic, said variable characteristic varying according to said confidence level.

9. The method of claim 8, wherein said characteristic is color.

10. The method of claim 8, wherein said characteristic is size.

11. The method of claim 8, wherein said characteristic is shape.

* * * * *